United States Patent [19]

Schwarzkopf

[11] 4,093,080

[45] June 6, 1978

[54] VEHICULAR TRAIN

[75] Inventor: Anton Schwarzkopf, Munsterhausen, Germany

[73] Assignee: Anton Schwarzkopf, Stahl- und Fahrzeuqbau, Munsterhausen, Germany

[21] Appl. No.: 772,265

[22] Filed: Feb. 25, 1977

[30] Foreign Application Priority Data

Mar. 1, 1976 Germany .............................. 2608424

[51] Int. Cl.² .............................................. B61G 1/00
[52] U.S. Cl. .................... 213/75 R; 105/4 R
[58] Field of Search .......... 105/4 R, 199, 200; 104/63 R, 53 R, 242–247; 308/72; 213/75 R; 403/90

[56] References Cited

U.S. PATENT DOCUMENTS

| 473,014 | 4/1892 | Mullaney | 213/75 R |
| 1,202,698 | 10/1916 | Ford | 403/90 |
| 2,674,957 | 4/1954 | Miler | 105/4 R |
| 2,963,986 | 12/1960 | Dobson | 213/75 R |
| 3,597,025 | 8/1971 | Ringel | 308/72 |
| 3,908,554 | 9/1975 | Schwarzkopf | 104/63 |

Primary Examiner—Trygve M. Blix
Assistant Examiner—D. W. Keen
Attorney, Agent, or Firm—Karl F. Ross

[57] ABSTRACT

A lead vehicle is hitched to a semitrailer-type follower vehicle by a universal coupling including a pair of generally horizontal arms, rigid with the respective vehicle bodies, which terminate in interfitted knuckles with part-spherical surfaces. The outer knuckle forms a pair of prongs firmly embraced by inner wall surfaces of a surrounding split housing whose halves, meeting in a vertical plane, are interconnected by a bolt carrying a spherically convex boss supporting the inner knuckle. The vehicles ride on a track transverse to the bolt axis, two sets of wheels of the lead vehicle being mounted on a pair of wheel mountings that are swingable about that axis and have extensions forming the housing.

14 Claims, 6 Drawing Figures

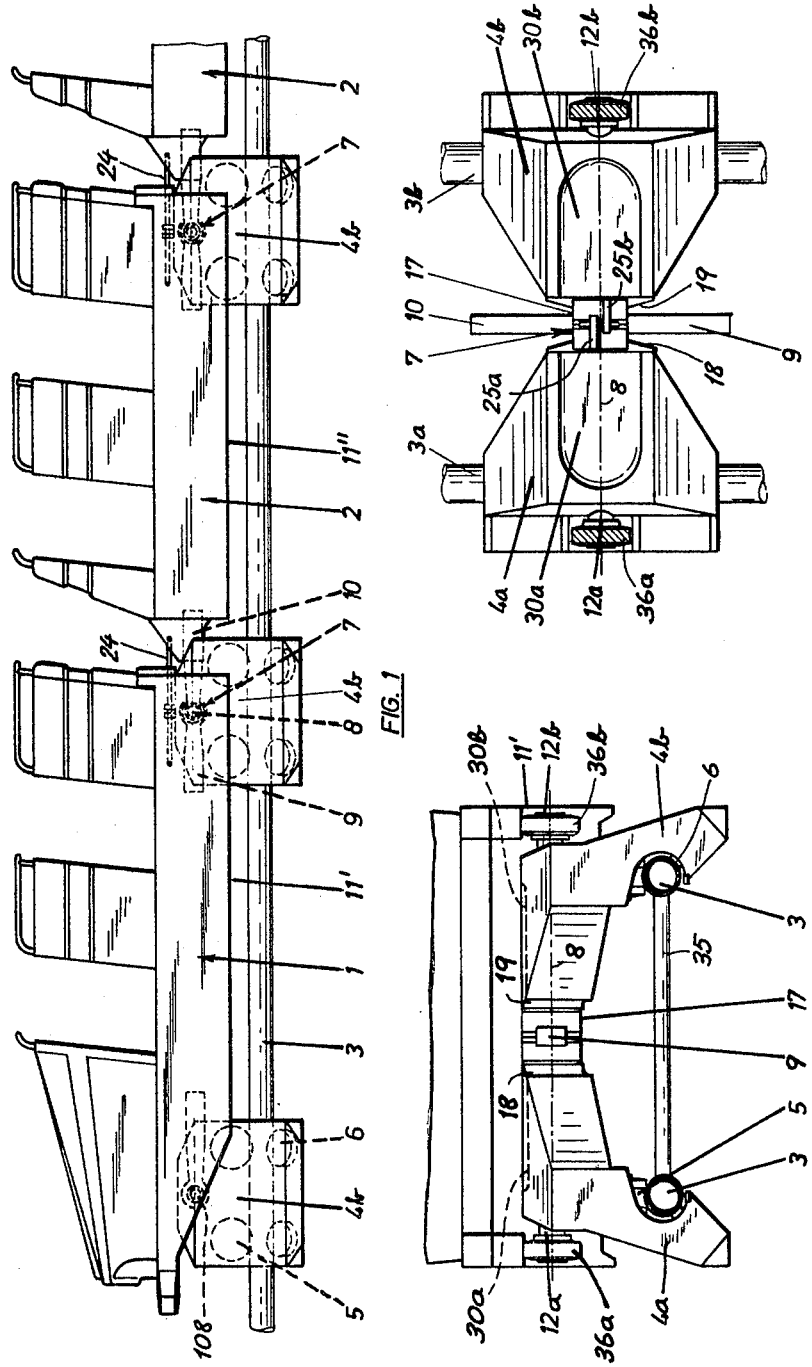

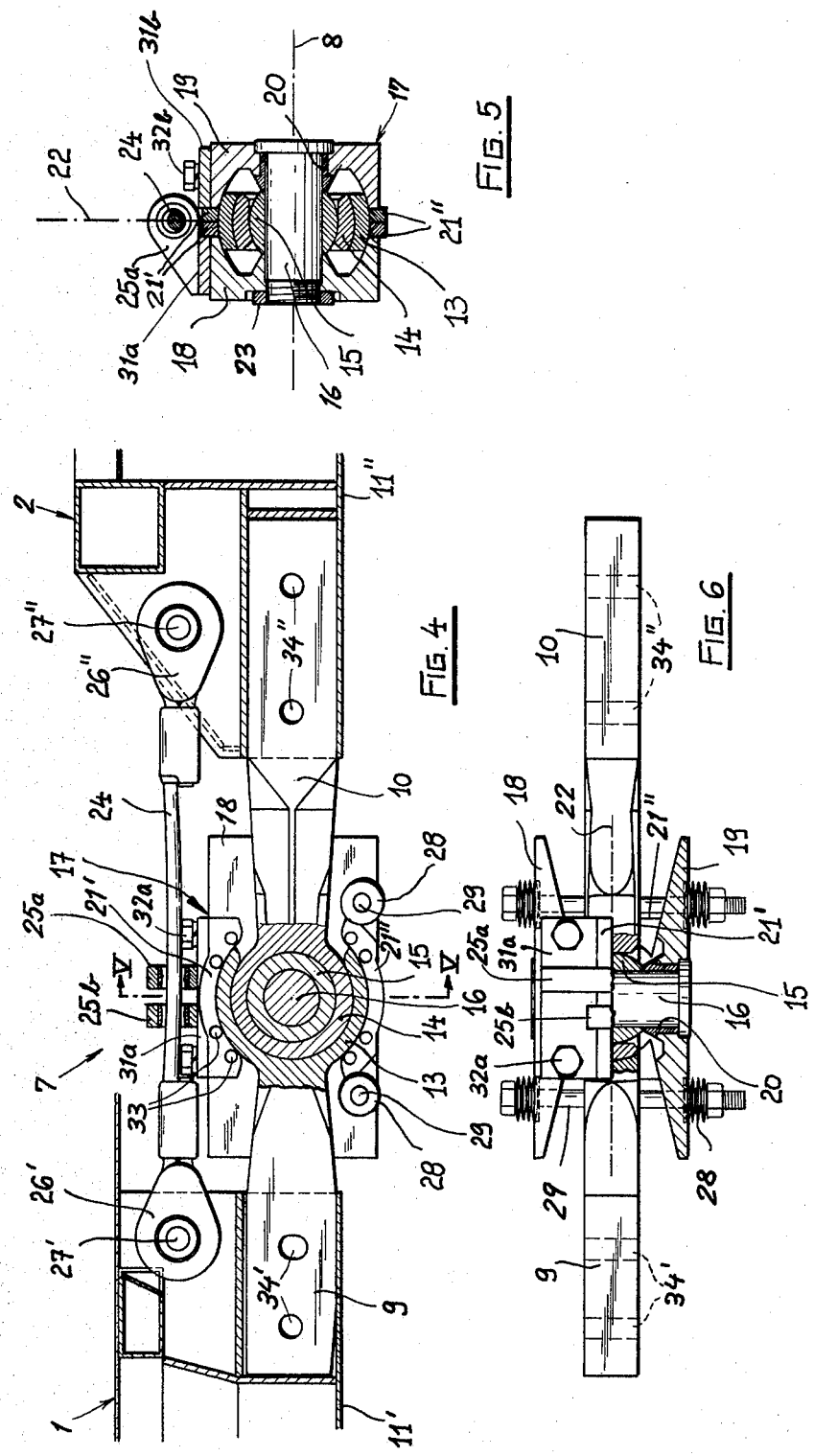

VEHICULAR TRAIN

FIELD OF THE INVENTION

My present invention relates to a train of two or more vehicles, particularly (but not exclusively) railborne vehicles used for scenic rides in an amusement park.

BACKGROUND OF THE INVENTION

In order to reduce the length of such a vehicular train, as for the purpose of accommodating more passengers on a given length of track, it is advantageous to design each vehicle following the first one as a semi-trailer hitched to the preceding vehicle with elimination of a forward wheel axle. The coupling between a lead vehicle and a single-axle follower vehicle, particularly for a scenic railway or the like, should be of the universal type allowing relative disalignment of the two vehicles in both a horizontal and a vertical plane, thereby letting the train make sharp turns and follow rapid slope changes in a manner characteristic of such rides. Such a universal coupling is especially difficult to realize with railborne vehicles whose wheels are constrained to follow the track without lateral excursions in the curves.

OBJECTS OF THE INVENTION

The general object of my present invention, therefore, is to provide an improved universal coupling for hitched vehicles, traveling on rails or on the road, which is capable of absorbing the stresses of driving through sharp curves as well as over hills and dales.

A related object is to provide standby linkages designed to prevent the separation of the vehicles in the event of failure of the coupling.

SUMMARY OF THE INVENTION

A universal coupling according to my present invention comprises a pair of wheel mountings or trucks, pivoted to opposite sides of the body of the lead vehicle for swinging about a common axis transverse to the direction of travel, and a pair of generally horizontal arms which are rigid with the bodies of the two vehicles, these arms extending in the direction of travel and terminating in interfitted knuckles of spherical curvature that are centered on the common swing axis of the wheel mountings.

Obviously, at least one of these knuckles must be hollow in order to embrace the other knuckle coacting therewith. To facilitate interfitting, and to provide the necessary play for a relative swinging of the two coupling arms, I prefer to design the first-mentioned knuckle as a pair of spherically curved prongs resiliently embracing the other knuckle, these prongs being separated by a gap accommodating the arm of the other knuckle with clearance. Since the prongs are liable to yield outwardly under severe stress, another feature of my invention resides in the provision of bracing means forming a spherically concave guide surface around the prongs to prevent the escape of the other knuckle embraced thereby. The bracing means are advantageously part of a housing formed about the knuckle joint by extensions of the associated wheel mountings.

Additional stabilization of the knuckle joint can be obtained, pursuant to still another feature of my invention, by the provision of a spherically convex supporting member in the housing, the inner knuckle being shaped as a ring with part-spherical internal and external peripheries contacting that supporting member by its inner periphery. The supporting member may be formed as a boss on a bolt diametrically traversing the housing and serving to hold its two halves together.

In order to prevent any untimely separation of the two hitched vehicles, still another feature of my invention resides in the provision of ancillary tie or link means interconnecting these vehicles as well as the two housing halves with sufficient yield to avoid interference with the normal operation of the aforedescribed universal coupling.

BRIEF DESCRIPTION OF THE DRAWING

The above and other features of my invention will now be described in detail with reference to the accompanying drawing in which:

FIG. 1 is a side-elevational view of part of a scenic-railway train embodying my invention;

FIG. 2 is a fragmentary end view of the lead vehicle of the train of FIG. 1, showing my improved coupling;

FIG. 3 is a top view of the coupling shown in FIG. 2, with the vehicle body removed;

FIG. 4 is a longitudinal sectional view of a knuckle joint and associated elements forming part of the coupling, drawn to a larger scale;

FIG. 5 is a cross-sectional view taken on the line V — V of FIG. 4; and

FIG. 6 is a top view, partly in section, of the assembly shown in FIGS. 4 and 5.

SPECIFIC DESCRIPTION

In FIGS. 1 – 3 I have shown part of a train for a scenic railway, figure-8 ride or the like comprising a lead vehicle 1 and several identical follower vehicles 2, each follower vehicle being hitched to the immediately preceding vehicle by a universal coupling 7 embodying my invention. Lead vehicle 1 has a body or frame 11' with a rear axle and a front axle centered on respective horizontal axes 8 and 108, each of these axles being defined by a pair of journal bearings 12a and 12b in lugs 36a and 36b rigid with the vehicle body as illustrated for the rear axle in FIGS. 2 and 3. Each follower vehicle 2 has only a rear axle identical with that of the lead vehicle.

Journal bearings 12a and 12b support a pair of swingable wheel mountings or trucks 4a and 4b each carrying two support wheels 5 and two guide wheels 6 engaging rails 3 which are interconnected by ties 35. Traction is provided by the support wheels of at least the lead vehicle driven by conventional (e.g. electric) motors, not shown, that are accommodated in cutouts 30a, 30b of wheel mountings 4a, 4b and can be energized in the usual manner via a nonillustrated third rail, for example. Cutouts 30a, 30b also serve to reduce the weight of the wheel mountings.

As shown in FIGS. 2 – 6, wheel mountings 4a and 4b are provided with respective cheeks 18 and 19 of generally triangular horizontal outline together defining a housing 17. Each of these cheeks carries an upper extension 21' and a lower extension 21" secured to it by screws 33, these extensions meeting at a vertical parting plane 22 (FIGS. 5 and 6) normally coinciding with a longitudinal plane of symmetry of the train 1, 2.

Frame 11' of vehicle 1 and a frame 11" of the immediately following vehicle 2 are rigid with a pair of substantially horizontal, longitudinally extending arms 9 and 10 entering the housing 17 from front and rear. Arm 9 terminates within the housing in an outer knuckle 13 consisting of an upper and a lower prong with spherically curved inner and outer peripheral surfaces, these prongs together encircling the axis 8 over an arc of about 270° within plane 22; in a transverse plane the arc is considerably smaller, amounting to approximately 30° per prong as seen in FIG. 5. Arm 10 terminates in an inner knuckle 14 of annular configuration, concentric with knuckle 13, whose outer peripheral surface has a spherical curvature conforming to that of the inner peripheral surface of the outer knuckle. The two knuckles are matingly interfitted, with the outer surface of knuckle 13 firmly guided within housing 16 by the corresponding curved inner wall surfaces of cheeks 18 and 19 as well as their reinforcing extensions 21' and 21" whereby knuckle 13 is braced against radial expansion of its prongs. This external bracing prevents the disengagement of the knuckles in response to strong longitudinal stresses tending to separate the lead vehicle 1 from the follower vehicle 2.

The universal joint formed by knuckles 13 and 14 is further strengthened by a spherically curved boss 15 supporting the knuckle 14 from within, this boss being rigid with a transverse bolt 16 spanning the two housing halves in line with axis 8. Thus, cheek 19 is provided with a bushing 20 against which the head of bolt 16 comes to rest, the opposite end of the bolt being threaded and fixedly held by a nut 23 against a shoulder of cheek 18. Bolt 16, accordingly, serves to hold the two housing halves together besides internally reinforcing the knuckle 14 against inward deformation; the bolt, however, does not exert any clamping force so that cheek 19 remains free to rotate around it with reference to cheek 18.

Assembly and disassembly of the knuckle joint takes place with the two housing halves separated and with knuckle 13 extracted therefrom, its prongs then yielding sufficiently to let the knuckle 14 be inserted or withdrawn. The introduction of boss 15 into knuckle 14, following such insertion, is facilitated by the fact that the inner peripheral surface of the latter knuckle is spherically curved only on one side of parting plane 22 (i.e. at left as shown in FIG. 5) and is substantially cylindrical on the opposite side. Despite this slightly unsymmetrical cross-section, the four concentrically nested members 17, 13, 14, 15 firmly engage one another over the entire relative-swing range of arms 9 and 10, this range being limited in a vertical plane by the gap separating the prongs of knuckle 13 and in a horizontal plane by the angle of divergence of the beveled cheeks 18 and 19.

It may nevertheless happen that a defect, e.g. rupture of one of the coupling arms 9 and 10, results in a threatening disengagement of the lead vehicle from its follower. In order to prevent such disengagement, I provide an ancillary flexible link in the form of a cable 24 with terminals 26', 26" fastened to bolts 27', 27" on vehicle frames 11' and 11", respectively. During normal operation, cable 24 is slack and does not interfere with the aforedescribed relative swingability of arms 9 and 10. The cable passes loosely through a pair of overlapping eyes 25a, 25b mounted on the upper edges of cheeks 18 and 19 with the aid of base plates 31a, 31b and screws 32a, 32b. The guidance of the cable 24 by these eyes not only holds the cable centered but also limits the extent to which the housing halves 18 and 19 can separate in the event of failure of bolt 16. Such separation if further limited by ancillary elastic tie means in the form of transverse rods 29 spanning the cheeks 18 and 19 below the level of the arms 9 and 10, these tie rods being loaded by Belleville springs 28 received in outer recesses of the cheeks. Thanks to this elastic connection, wheel mountings 4a and 4b are free to swing independently of each other about their common axis 8, e.g. when the vehicle 1 passes through a banked curve formed by the track 3, 35. The rotational independence of the wheel mountings allows the use of completely rigid vehicle bodies.

The extremities of arms 9 and 10 remote from coupling 7 are shown provided with bores 34', 34" for the passage of nonillustrated fastening screws by which they are detachably secured to the respective frames. Arm 9 is shown to be received in a socket of frame 11' with a certain amount of play, one of its bores 34' being slightly elongated to facilitate its initial alignment with arm 10.

I claim:

1. In a vehicular train including a lead vehicle and a follower vehicle hitched to said lead vehicle by a universal coupling, each of said vehicles being provided with a wheeled body, the improvement wherein said coupling comprises:
    a pair of wheel mountings pivoted to the body of said lead vehicle on opposite sides thereof for swinging about a common axis transverse to the direction of vehicular motion; and
    a pair of generally horizontal arms rigid with the bodies of said vehicles, said arms extending in said direction and terminating in interfitted knuckles of spherical curvature centered on said axis, one of said knuckles forming a pair of spherically curved prongs resiliently embracing the other of said knuckles, said prongs being separated by a gap accommodating with clearance the arm of said other of said knuckles; and
    bracing means independent of said arms forming a spherically concave guide surface around said prongs, thereby preventing same from spreading.

2. The improvement defined in claim 1 wherein said wheel mountings are provided with extensions forming a housing about said knuckles, said bracing means being part of said housing.

3. The improvement defined in claim 2 wherein said other of said knuckles forms a ring with part-spherical internal and external peripheries, further comrising a spherically convex supporting member in said housing engaging the internal periphery of said ring.

4. The improvement defined in claim 3, further comprising a bolt traversing said housing, said supporting member being a boss on said bolt.

5. The improvement defined in claim 4 wherein said bolt is aligned with said axis.

6. The improvement defined in claim 5 wherein said extensions form respective halves of said housing meeting in a substantially vertical plane, said halves being rigidly interconnected by said bolt.

7. The improvement defined in claim 8 further comprising ancillary spring-loaded tie means yieldably interconnecting said halves.

8. The improvement defined in claim 1, further comprising ancillary flexible link means interconnecting said bodies.

9. The improvement defined in claim 1 wherein said vehicles are railborne, said wheel mountings carrying rail-engaging support and guide wheels.

10. In a vehicular train including a lead vehicle and a follower vehicle hitched to said lead vehicle by a universal coupling, each of said vehicles being provided with a wheeled body, the improvement wherein said coupling comprises:
- a pair of wheel mountings pivoted to the body of said lead vehicle on opposite sides thereof for swinging about a common axis transverse to the direction of vehicular motion;
- a bolt centered on said axis interconnecting said wheel mountings with freedom of relative rotation about said axis; and
- a pair of generally horizontal arms rigid with the bodies of said vehicles extending in said direction, one of said arms terminating in an annular inner knuckle traversed by said bolt and provided with a spherically curved outer surface, the other of said arms terminating in an outer knuckle with a spherically curved inner surface surrounding said inner knuckle.

11. The improvement defined in claim 10 wherein said outer knuckle forms a pair of spherically curved prongs resiliently embracing said inner knuckles, said prongs being separated by a gap accommodating with clearance said one of said arms.

12. The improvement defined in claim 11, further comprising bracing means rigid with said wheel mountings forming a spherically concave guide surface around said prongs for preventing same from spreading.

13. The improvement defined in claim 10 wherein said inner knuckle has a part-spherical internal periphery, further comprising a spherically convex boss on said bolt engaging said internal periphery.

14. The improvement defined in claim 10, further comprising ancillary flexible link means interconnecting said bodies, said wheel mountings having eyes traversed by said link means for guiding the latter and limiting a separation of said wheel mountings upon failure of said bolt.

* * * * *